May 5, 1964 S. P. BROWN 3,131,508
PROGRAMMING DEVICE FOR TOYS, VEHICLES AND THE LIKE
Filed Dec. 30, 1960 3 Sheets-Sheet 1
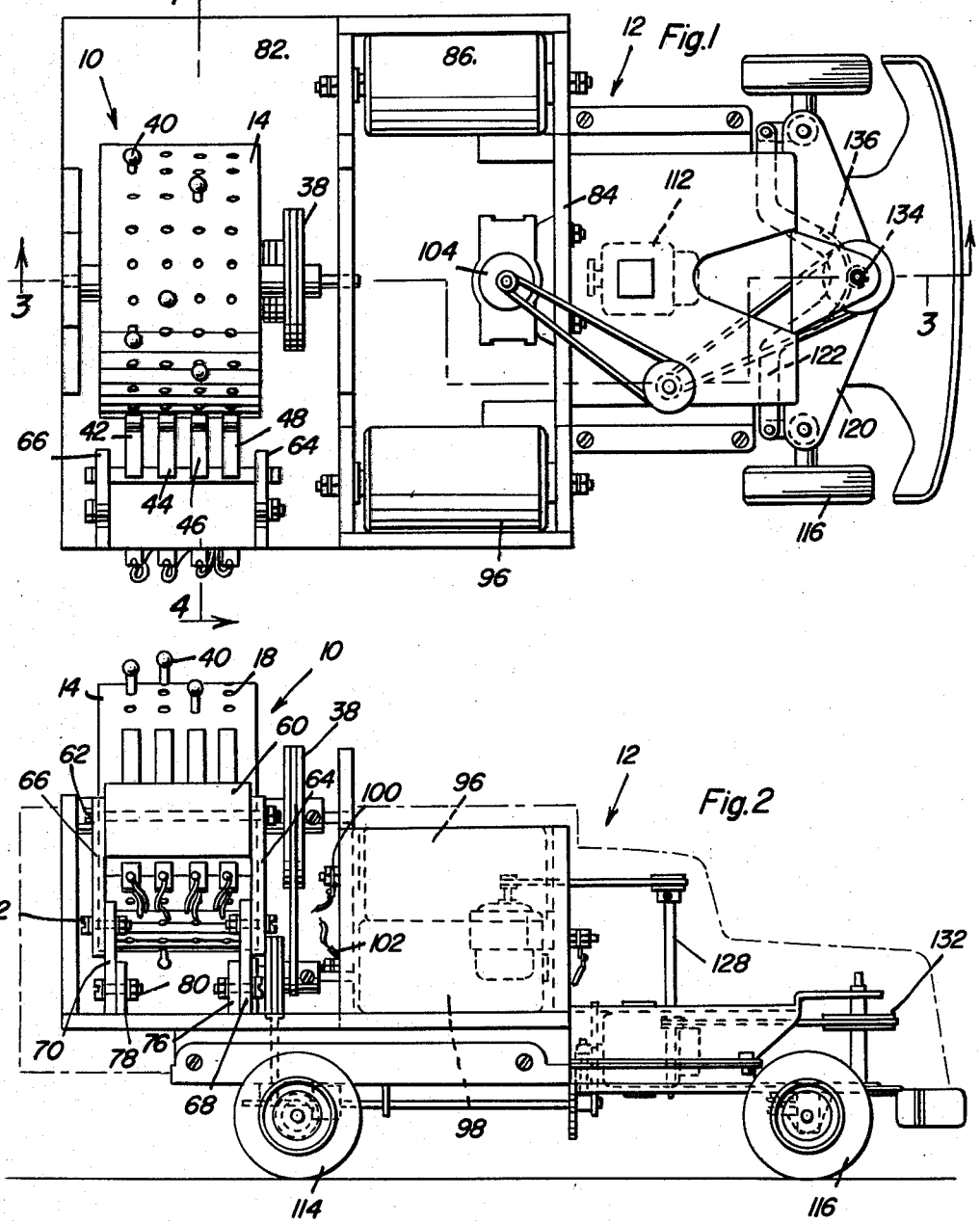
Sam P. Brown
INVENTOR.

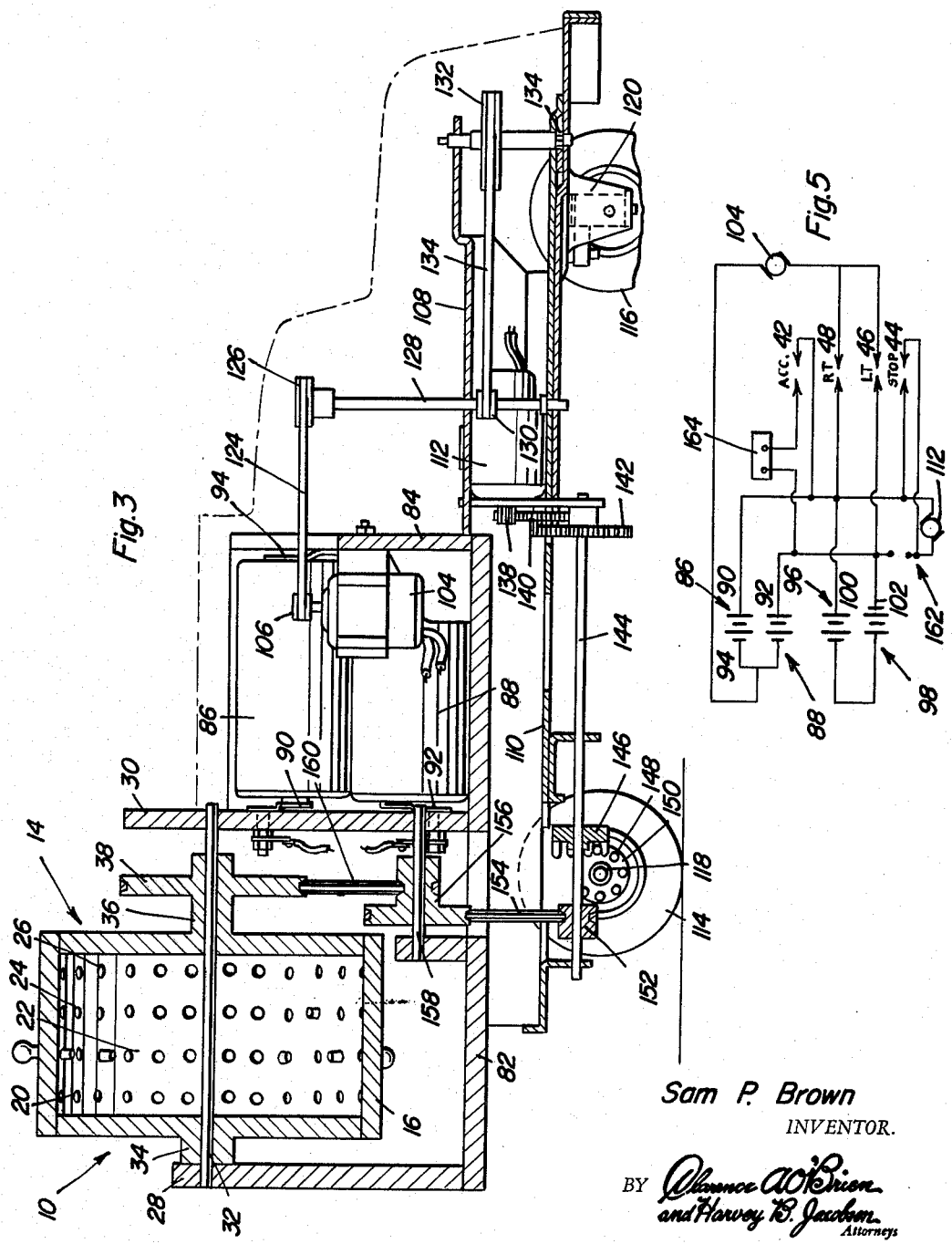

May 5, 1964 S. P. BROWN 3,131,508
PROGRAMMING DEVICE FOR TOYS, VEHICLES AND THE LIKE
Filed Dec. 30, 1960 3 Sheets-Sheet 3
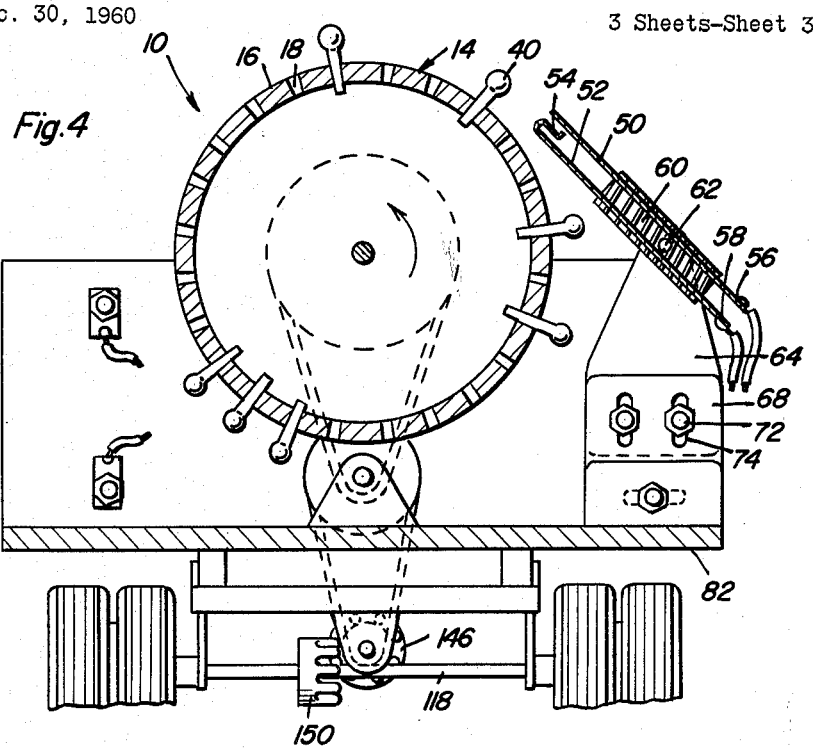
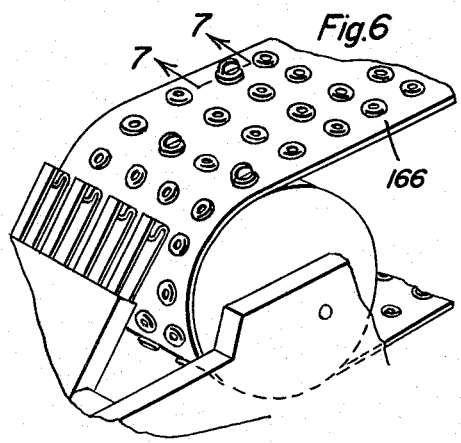
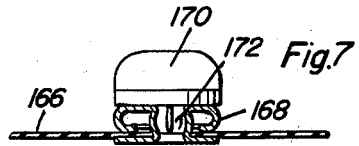
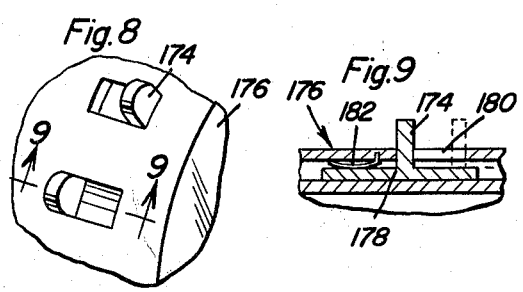
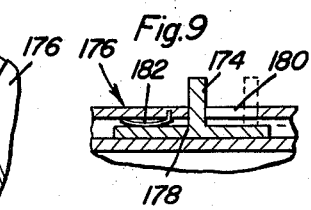
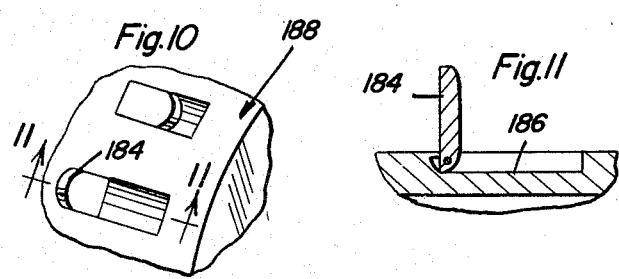
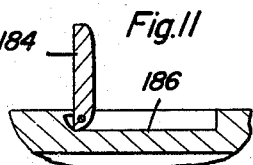
Sam P. Brown
INVENTOR.
BY *Clarence A. O'Brien*
*and Harvey B. Jackson*
Attorneys

United States Patent Office 3,131,508
Patented May 5, 1964

3,131,508
PROGRAMMING DEVICE FOR TOYS, VEHICLES AND THE LIKE
Sam P. Brown, Tulsa, Okla.
(239 5th Ave., Leavenworth, Kans.)
Filed Dec. 30, 1960, Ser. No. 79,713
15 Claims. (Cl. 46—244)

The present invention relates to a programming switch device of a novel construction making it particularly useful for preplanned or programmed control of toy vehicles, robots, musical instruments and the like as well as for the control of automation activities in general.

Programming switch devices have heretofore been used for various purposes but have been characterized by arrangements or constructions which do not lend themselves for use in installations requiring constant change, simplicity of use and economy of manufacture for which purposes the present invention is especially desirable. Previous programming devices accordingly involve punched tape systems which not only required replacement of the tape with each program change but also costly equipment for producing the program on and from the tape. Other programming devices also involve complicated switching devices for operation in association therewith. It is therefore a primary object of this invention to provide an extremely simple and yet effective programming device which is readily changeable and adjustable and which may be manufactured with great economy and installed in a wide variety of devices which one seeks to control in some preplanned manner.

Another object of this invention is to provide a programming device involving a plurality of adjustably mounted flexible switch devices which are normally in open position and which are closed by a novel program continuously movable surface in order to sequentially control electrical circuits connected to motors by means of which various operations may be performed in a programmed manner.

An additional object of this invention is to provide a programming device which features an endlessly moving program surface such as a hollow drum or flexible belt made of material which contains a plurality of rows of equally spaced apertures within which switch actuating pegs or cam members are selectively received for sequentially actuating switch devices adjustably mounted adjacent to the drum or belt for such purpose. The cam members thereby be easily and readily inserted or operatively positioned within the apertures at different circumferential positions in each row of apertures in order to engage the different switches in timed relation to each other by means of which controlled movement, turning and operation of other accessories in a toy vehicle for example may be performed.

A still further object of this invention is to provide a programming switch device involving a plurality of rows of switch actuating cam receiving apertures on the outside surface, the drum being drivingly connected to either a program controlled motor or an independently operated motor so that by selectively placing cam pegs into the drum apertures a plurality of switches which are adjustably mounted relative to the rotating drum may be actuated and released in predetermined timed relation to movement of the drum to thereby provide a program control of an electrical circuit the program being controlled solely by the drum and its rate of movement. The programming device may accordingly be readily adapted for toy vehicle operation, message and music producing operations, toy robot operations and may also be useful for controlling industrial processes.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIGURE 1 is a top plan view of a toy vehicle with the novel programming device of this invention installed therein.

FIGURE 2 is a side elevational view of the construction illustrated in FIGURE 1.

FIGURE 3 is a sectional view taken through a plane indicated by section line 3—3 in FIGURE 1.

FIGURE 4 is a sectional view taken through a plane indicated by section line 4—4 in FIGURE 1.

FIGURE 5 is a schematic circuit diagram of a typical control system upon which the novel programming device of this invention may be operative.

FIGURE 6 is a partial perspective view of a modified type of programming device in accordance with this invention.

FIGURE 7 is a sectional view taken through a plane indicated by section line 7—7 in FIGURE 6.

FIGURE 8 is a second modification of the programming device pursuant to this invention.

FIGURE 9 is a sectional view taken through a plane indicated by section line 9—9 in FIGURE 8.

FIGURE 10 is a third modification of the programming device.

FIGURE 11 is a sectional view taken through a plane indicated by section line 11—11 of FIGURE 10.

Referring now to the drawings in detail, FIGURES 1 and 2 illustrate one particular installation of the novel programming device generally indicated by the reference numeral 10 in a toy vehicle generally indicated by the reference numeral 12. The toy vehicle installation and the controlled movement thereof as will be hereafter explained with greater detail, is the type of installation to which the programming device 10 is particularly suited in view of the simplicity of its construction, the ease with which the program may be changed and the economy with which it may be manufactured.

Referring now to FIGURES 3 and 4 in particular it will be noted that the programming device 10 includes a rotatable drum generally referred to by reference numeral 14. The drum 14 includes a cylindrical surface member 16 having a plurality of rows of equally spaced cam peg receiving apertures 18. It will be noted that four rows 20, 22, 24 and 26 of apertures are provided by the drum 14. It should of course be understood that any other number of rows may also be provided depending upon the axial length of the drum while the number of spaced apertures 18 in each row, will depend upon the diameter of the drum. It will be apparent therefore, that with an increased number of rows and apertures, the programming combinations possible will correspondingly increase. The drum must accordingly be continuously driven preferably at a slow speed by timing gear means and is accordingly installed between upright members 28 and 30 fixed to vehicle frame which carry therebetween the support rod member 32. The drum 14 is rotatable on the rod member 32 and has axially projecting sleeve portions 34 and 36 on opposite sides thereof. A drive pulley 38 is connected to the sleeve portions 36 for the purpose of imparting rotation to the drum. It will also be observed that there are a plurality of cam pegs 40 which are selectively positioned within apertures 18 of the various rows 20, 22, 24 and 26, which pegs 40 project beyond the member 16.

Mounted toward one side of the drum 14, are a plurality of switch devices 42, 44, 46 and 48 which are respectively aligned with each of the rows of apertures 18. Accordingly, when a cam projection 40 is placed in an aperture in one of the rows it will temporarily close the corresponding switch device associated with its row once each revolution of the drum 14 for an interval the duration of which will depend upon the adjustable positioning of the switch device relative to the drum. It will therefore be apparent that each of the switch devices will be periodically closed in timed relation to each other at predetermined spaced intervals of time depending upon the spacing between the pegs 40 in each row and the speed of rotation of the drum 14. As seen in FIGURES 1, 2 and 4, each of the switch devices includes an upper spring arm 50 and a lower spring arm 52 both of which are of conductive material. The lower switch arm 52 includes a contact portion 54 at its upper end while terminal portions 56 and 58 are connected to the lower ends of each of the arms to which conductor leads are connected as by welding. Each pair of arms of each switch device are mounted in a switch holder member 60 in spaced relation to each other which holder member 60 is of non-conductive material. The holder member 60 is accordingly mounted by member 62 in pivotally adjusted position between a pair of bracket members 64 and 66. The bracket members 64 and 66 are in turn adjustably mounted in a vertical direction on a pair of upstand-support members 68 and 70 by means of a pair of bolt members 72 adjustably positioned within aligned slots 74 in members 68 and 70. The members 68 and 70 are in turn adjustably mounted relative to members 76 and 78 in a lateral direction by means of bolts 80 adjustably positioned with respect to slots in the members 68 and 70. The members 76 and 78 are connected to bed member 82 of the vehicle 12.

Referring now to FIGURES 1, 2 and 3 in particular it will be noted that the frame members 28 and 30 are connected to the rear half of the vehicle bed member 82 between which the programming device 10 is mounted. Disposed between the frame member 30 and a lower frame member 84 is a power source including batteries 86 and 88 in contact with terminal elements 90 and 92 and being interconnected electrically in series at the opposite ends thereof by elements 94. The batteries 86 and 88 are mounted on one side of the compartment defined between the members 30 and 84 while a second pair of batteries 96 and 98 are similarly interconnected and contact the terminals 100 and 102. The terminals 90, 92, 100 and 102 are suitably mounted in the wall frame member 30 and have conductor leads connected thereto for suitable connection in the wiring circuit which may be disposed beneath the vehicle bed member 82.

It will also be noted, that a steering control motor 104 constituting one form of operational control is mounted on the wall frame member 84 between the power supply batteries. The motor shaft extends upwardly from the motor 104 and has connected thereto a pulley belt wheel 106. Also mounted forwardly of the member 84 is a frame member 108 while mounted in spaced relation below the member 82 is a frame member 110. Disposed between the members 110 and 108 forwardly of the member 84 is a vehicle drive and programming motor 112. The drive wheels for the vehicle 12 are the rear wheels 114 while the front wheels 116 constitute the steering wheels. Accordingly, the drive wheels 114 are interconnected by a drive axle 118 while the front wheels are pivotally mounted by frame member 120 and are interconnected by member 122 for steering of the wheels 116 simultaneously in the same direction about their vertical axes.

It will therefore become apparent that the steering motor 104 is drivingly connected to the interconnecting member 122 for intermittent steering of the front wheels 116 while the drive and programming motor 112 is drivingly connected to the drive axle 118 and to the programming drum 14 for continuous drive thereof. It will therefore be observed that a rubber band belt member 124 drivingly engages the pulley wheel 106 of the motor 104 with a pulley wheel 126 connected to the upper end of an intermediate shaft member 128 journaled by the spaced frame members 108 and 110. Pulley wheels 130 connected to the shaft 128 accordingly is drivingly connected to the driven pulley wheel 132 by the rubber band belt 134. The driven pulley wheel 132 which is also journaled between the spaced frame members 108 and 110 has connected thereto adjacent the lower end thereof a pinion 134 which meshes with a sector rack gear 136 formed on the interconnecting member 122. It will therefore be understood, that the motor 104 is drivingly connected to the front wheel steering connecting member 122 for intermittent displacement thereof in opposite directions which driving connection is at a high reduction ratio and the motor 104 is necessarily of the reversible type. The drive motor 112 on the other hand, is continuously driven in one direction during the programmed cycle and is geared by pinion 138, compound gear 140 and gear 142 to a drive shaft 144 rotatably mounted below the frame member 110. The shaft 144 is thereby driven at a reduced speed with respect to the motor 112 for driving a slot tooth crown gear 146 which meshes with pin teeth 148 on a disk 150 connected to the drive axle 118 for continuously driving the rear drive wheels 114 in one direction. Also connected to the drive shaft 144 is a timing drive for the drum 14 including a drive pulley 152 belt connected by rubber band 154 to the intermediate compound drive pulley member 156. The compound pulley member 156 is rotatably mounted on the shaft member 158 and is belt connected by rubber band belt 160 to the pulley wheel 38 connected to the drum 14 for simultaneous continuous drive thereof. Accordingly, the drum 14 is continuously driven at an even slower speed than the rear driving wheels 114 during the programmed cycle through the motor 112. Alternatively, the program device 14 may be driven independently by a separate motor.

Referring now to FIGURE 5, the program operation of the vehicle 12 will become apparent. It will be noted from FIGURE 5, that the batteries 86 and 88 interconnected to each other by elements 94 are connected to one terminal of the motor 104 while the other terminals 90 and 92 of the batteries 86 and 88 are connected to the programming and drive motor 112. The batteries 96 and 98 are interconnected just to each other while the terminals 100 and 102 thereof are also connected to the drive motor 112. Accordingly, with the starting switch 162 closed the drive motor 112 will be energized by both pairs of batteries to cause propulsion of the vehicle and rotation of the programming drum 14. Although one terminal of the steering motor 104 is connected to the pair of batteries 86 and 88, the other terminal thereof is alternatively connectible through either the switch device 46 or the switch device 48 to terminals 90 and 96 of each pair of batteries or terminals 92 and 102 of opposite polarity of each pair of batteries. Therefore, upon closing of one switch device 46 the steering motor 104 will rotate in one direction whereas closing of the other switch device 48 will cause rotation of the steering motor 104 in the opposite direction. It will therefore be appreciated that with rotation of the programming drum 14 the motor 104 will be angularly displaced a predetermined amount at different preplanned times depending upon the closing times and periods of the switch 46 or switch 48 for the purpose of steering the vehicle in one or the other direction. It will be further noted, that the switch device 42 when closed by a cam pin 40 on the drum 14 will close a parallel circuit to an accessory device 164 that may be mounted on the vehicle 12 such as a light or buzzer. The fourth switch device 44 may be closed by a suitably mounted cam pin 40 after a predetermined amount of angular movement of the drum 14 whereupon the drive motor 112 will be shorted out causing the vehicle to stop. Thus, the drum 14 will program the time of closing and duration of closing of each switch in accordance with its rotational speed to control a plurality of separate and interrelated operational cycles as well as its own programming cycle. Nevertheless, each of said cycles may be changed merely by the aforementioned reconditioning of the drum programming surface.

From the foregoing, it will be appreciated that other types of operational control circuits may be utilized in association with the programming device 10 for example also reversing the drive of the vehicle 12. Similarly, the programming device 10 may be utilized with control circuits for operation of toy robots or musical devices or wherein any program switching action is involved. It will be appreciated therefore, that not only may the program be changed readily for any particular installation of the device 10 by insertion and removal of the pegs 40 from the drum 14, but the device may be readily installed in various other installations.

In FIGURES 6 and 7 there is illustrated a modification of the programming device in which the drum 14 is replaced by an endless belt 166. It will therefore be appreciated that by use of a belt instead of the drum, a greater number of spaced switch cam projections may be mounted in order to perform a greater number and longer sequence of operations. The belt 166 is accordingly made of a suitable flexible material and includes a plurality of rows of spaced cam receiving apertures which are in the form of snap receiver devices 168. The cam projections 170 accordingly have mounted therebelow projections 172 which are suitably received in the yielding aperture of the snap device 168. A programming device of relatively rugged assembly and made of standard and easily available materials may therefore be made pursuant to the principles of this invention.

FIGURES 8 and 9 illustrate a further modification of the invention wherein the switch actuating projections of the previously described devices are replaced by a plurality of upwardly projecting cam actuator members 174 which are slidably mounted below the surface of the drum 176 by means of a laterally projecting base portion 178 with the sliding movement of the projection 174 being limited by the slot 180 within which it is movable. A friction spring element 182 yieldably holds the projection 174 in either of its positions. It will therefore be apparent that the projection 174 in one position in the slot will be in an operative position wherein it may engage the switch device aligned with the row in which the projection is disposed while in the other position within the slot 180 the projection 174 can never engage any switch device. Accordingly, the projections 174 will always be present in the programming drum 176 but may be selectively positioned within the slots 180 to program operations in a most facile manner.

FIGURES 10 and 11 illustrate a third embodiment in which the switch actuating projections 184 are selectively positioned in an inoperative position by being disposed within a recess 186 formed in the surface of the drum 188. The projections 184 are accordingly pivotally mounted within the recess 186 and when they are pivotally extended upwardly as illustrated in FIGURE 11 will be in an operative position for engaging the switch device which may be aligned with the particular row of recesses 186 in the drum 188. This latter modification of the invention accordingly also requires no addition to or removal of cam members from the programming drum but only operative positioning thereof in an extended or retracted position for programming purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. A programming device for sequentially controlling maneuvers and operations of a toy vehicle or the like comprising the combination of frame means, a plurality of independently operable control means mounted on the frame means, a plurality of biased-open switch means adjustably mounted on the frame means in fixed alignment with respect to each other and operatively connected to said control means, programmed surface means movably mounted by the frame means in adjacent spaced relation to the switch means, means for continuously moving the surface means relative to the switch means, a plurality of rows of spaced cam receiving means mounted on said surface means, each row being in alignment with each of the respective switch means and selectively positionable projecting cam actuating means mounted in each row of cam receiving means for selectively changeable programmed engagement of each projecting cam means in timed relation to said continuous movement of the surface means to control both the instant and duration of closing of each of said switch means.

2. The combination of claim 1, including means for propelling the frame means and wherein one of the control means is operatively connected to the propelling means for controlling propulsion of the frame means and continuous movement of the programmed surface means relative to the switch means.

3. The combination of claim 2, including means for directionally changing movement of the frame means and wherein another of the control means is operatively connected to said directional changing means for controlling the direction of movement of the frame means.

4. The combination of claim 1, wherein said switch means include mounting bracket means adjustably mounted on the frame means relative to the surface means to vary the interval of closing of the switch means by the cam means, switch holder means mounted on the bracket means in adjusted pivotal position relative thereto and a plurality of pairs of spaced apart switch spring arms mounted in the switch holder means adapted to be displaced into contact with each other when engaged by said projecting cam actuating means.

5. The combination of claim 4, wherein said rows of spaced cam receiving means comprises a plurality of aperture means removably receiving said cam actuating means which project above said surface means for engagement of the switch means.

6. The combination of claim 5, wherein said surface means is a hollow drum rotatably mounted by the frame means.

7. The combination of claim 1, wherein said rows of spaced cam receiving means comprise a plurality of aperture means removably receiving said cam actuating means which project above said surface means for engagement of the switch means.

8. The combination of claim 7, wherein said cam receiving aperture means and cam actuating means include friction snap devices mounted thereon.

9. The combination of claim 8, wherein said surface means comprises an endless flexible belt for removably receiving said projecting cam actuating means.

10. The combination of claim 1, wherein said projecting cam actuating means are selectively displaceable within said cam receiving means between an operative engaging position and an inoperative position for programming purposes.

11. The combination of claim 10, wherein said cam actuating means are pivotally mounted in the cam receiving means for movement between a projecting and non-projecting position relative to the surface means.

12. The combination of claim 1, wherein said cam actuating means are selectively slidable within said cam receiving means between an operative engaging position and an inoperative position.

13. The combination of claim 1, wherein said frame means is a vehicle and said control means includes a vehicle drive motor drivingly connected to the continuous moving means for the programmed surface means and a vehicle steering motor, said switch means being operative in response to intermittent closing by the actuating cam means to cause the vehicle to move, and turn.

14. In a wheeled toy vehicle having first and second motors for driving and steering the wheels thereof, a source of power carried on said vehicle, circuit means connecting said power source and first and second motors, a drum operatively engaged with said wheels for continuous movement therewith, said drum being insulated from said power source, switch means connected with said circuit means and comprising a pluraltiy of switch members adjustably spaced from said drum and respectively connected to said first and second motors for controlling driving and steering of the vehicle, said switch members including spaced contact arms, and selectively positioned projections on the drum for programmed engagement of said switch members for displacement of said arms into contact with each other for contact intervals in accordance with the rate of said continuous movement and the adjustable spacing of the drum relative to the switch members.

15. A self-controlled device having, in combination, a wheeled vehicle provided with a drive motor, steering mechanism, and an electrically-controlled device for operating the steering mechanism for guiding movement of the vehicle along a programmed path, a power source mounted in the vehicle adapted to continuously energize said drive motor and intermittently energize said electrically controlled device to respectively move and steer the vehicle, programmed control means continuously driven by said drive motor for establishing electrical connections from the power source to the drive motor and the electrically-controlled device for respective energization thereof to prescribed said programmed path and means operatively connected to the programmed control means to deenergize the drive motor for terminating programmed movement of the vehicle.

References Cited in the file of this patent
UNITED STATES PATENTS

| | | |
|---|---|---|
| 2,039,920 | Moore | May 5, 1936 |
| 2,246,381 | Paull | June 17, 1941 |
| 2,775,848 | Isaacson | Jan. 1, 1957 |
| 2,887,832 | Leonard | Apr. 14, 1959 |
| 2,993,299 | Dingee et al. | July 25, 1961 |

FOREIGN PATENTS

| | | |
|---|---|---|
| 1,158,832 | France | Feb. 3, 1958 |